United States Patent [19]

Gum, Jr. et al.

[11] 3,760,013

[45] Sept. 18, 1973

[54] 1-(DICHLORONITROMETHYL)BENZENE

[75] Inventors: Wilson F. Gum, Jr.; David A. Nelson, both of Midland, Mich.

[73] Assignee: The Dow Chemical Company, Midland, Mich.

[22] Filed: Sept. 15, 1972

[21] Appl. No.: 289,320

[52] U.S. Cl. .................................. 260/646, 424/349
[51] Int. Cl. ............................................. C07c 79/12
[58] Field of Search ..................................... 260/646

[56] References Cited

UNITED STATES PATENTS 3,544,640 12/1970 Frankel et al.................... 260/646 X
3,580,948 5/1971 Morris ............................ 260/646 X

*Primary Examiner*—Leland A. Sebastian
*Attorney*—William M. Yates et al.

[57] ABSTRACT

1-(Dichloronitromethyl)benzene was prepared and found to be active as a bacteriocide and fungicide.

1 Claim, No Drawings

1-(DICHLORONITROMETHYL)BENZENE

PRIOR ART

Various halonitromethyl substituted compounds have been prepared by the reaction of halonitromethane or ethane with olefins as shown by Baskakov et al.; Zhur. Obsch. Khim. 29 1203 (1959). However, no such compounds have been prepared employing aromatics instead of olefins. The halonitromethanes themselves have been taught in U. S. Pat. No. 3,159,686. Baker et al., J. Chem. Soc. 2462 (1926) taught the preparation of phenylnitromethane and various other compounds including phenyldibromonitromethane. No utility was taught for these compounds.

SUMMARY OF THE INVENTION

The invention is directed to the novel compound 1-(dichloronitromethyl)benzene, also known as $\alpha,\alpha$-dichloro--$\alpha$-nitrotoluene and phenyldichloronitromethane which corresponds to the formula

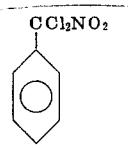

The novel compound of the present invention is a liquid having very slight solubility in water and very good solubility in conventional organic solvents such as acetone, benzene, dichloromethane, carbon tetrachloride, ethanol and isopropanol. This novel compound has been found to have utility as an active constituent in fungicidal and bacteriocidal compositions.

The 1-(dichloronitromethyl)benzene compound of the present invention can be prepared by the reaction of phenylnitromethane and sodium hypochlorite.

In carrying out this reaction, the two reactants are brought together in molecular ratios of 1 mole of the phenylnitromethane to 2 moles of the sodium hypochlorite and in the presence of a solvent or reaction medium such as methanol, ethanol, or isopropanol and maintained together under slight heat for a period of 5 to 10 hours. Thereafter, the organic layer is separated from the inorganic layer by extraction with a solvent such as chloroform or methylene chloride and dried. The solvent is removed by evaporation under reduced pressure leaving the product as a residue.

DESCRIPTION OF SOME PREFERRED EMBODIMENTS

The following examples serve to illustrate the practice of the present invention but are not intended to be limitations upon the overall scope of the same.

Example I: 1-(Dichloronitromethyl)benzene

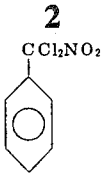

To a solution of 500 milliliters of methanol and 15 grams (0.11 mole) of phenylnitromethane at 30°C. was added 360 milliliters of 5 percent sodium hypochlorite. The reaction mixture was maintained at a temperature between 30° and 45°C. for 8 hours. The reaction mixture was thereafter extracted twice with 200 milliliter portions of chloroform and the organic layer obtained was dried over anhydrous potassium sulfate. The solvent was removed by evaporation under reduced pressure. A two phase oil resulted and the bottom layer was distilled to give the 1-(dichloronitromethyl)benzene product. The product had a boiling point of 62°C. and a refractive index of $n\ 20/D = 1.5483$ and upon analysis was found to have carbon, hydrogen and nitrogen contents of 41.50, 2.50 and 6.95 percent, respectively, as compared with the theoretical contents of 40.70, 2.42 and 6.81 percent, respectively, calculated for the above named structure.

The compound of the present invention is adapted to be employed as the active toxicant in bacterial or fungicidal compositions. For such uses, the compound can be employed in an unmodified form or dispersed on a finely divided solid and employed as a dust. Such mixtures can also be dispersed in water with or without the aid of a surface active agent and the resulting aqueous suspension employed as a spray. In other procedures, the product can be employed as the active constituent in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing the toxicant in concentrations usually from about 0.1 to about 10,000 parts or more by weight of the compound per million parts of such composition.

In a representative operation, 1-(dichloronitromethyl)benzene when employed as the sole toxicant in a nutrient agar at a concentration of 500 parts by weight per million parts of agar was found to give 100 percent kill and control of the organisms *Candida albicans, Trichophyton mentagrophytes, Bacillus subtilis, Aspergillus terreus, Candida pelliculosa, Pullularia pullulans, Mycobacterium phlei, Ceratocystis IPS, Cephaloascus fragans* and *Trichoderm Sp.*

What is claimed is:

1. 1-(Dichloronitromethyl)benzene.

* * * * *